United States Patent
Winstead et al.

(10) Patent No.: US 7,391,855 B2
(45) Date of Patent: Jun. 24, 2008

(54) SYSTEM AND METHOD FOR IMPLEMENTATION OF A CALLED PARTY PREPAYMENT PLAN

(75) Inventors: Regina L. Winstead, Suwanee, GA (US); Daniel Tor, Lawrenceville, GA (US)

(73) Assignee: Verizon Business Global LLC, Ashburn, VA (US)

(*) Notice: Subject to any disclaimer, the term of this patent is extended or adjusted under 35 U.S.C. 154(b) by 125 days.

(21) Appl. No.: 10/890,230

(22) Filed: Jul. 14, 2004

(65) Prior Publication Data

US 2005/0078808 A1     Apr. 14, 2005

Related U.S. Application Data

(60) Provisional application No. 60/510,132, filed on Oct. 14, 2003.

(51) Int. Cl.
H04M 15/00 (2006.01)
H04M 7/00 (2006.01)

(52) U.S. Cl. .............................. 379/114.21; 379/114.15; 379/114.2; 379/222

(58) Field of Classification Search ................. 379/111, 379/112.01, 114.01–114.03, 114.06–114.1, 379/114.12–114.24, 128, 133–134, 222–223, 379/127.02–127.05, 144.01, 144.02
See application file for complete search history.

(56) References Cited

U.S. PATENT DOCUMENTS

| 5,265,155 | A | * | 11/1993 | Castro ...................... 379/114.2 |
| 6,249,573 | B1 | * | 6/2001 | Hudson ................... 379/114.2 |
| 6,266,401 | B1 | * | 7/2001 | Marchbanks et al. ........ 379/116 |
| 6,480,588 | B1 | | 11/2002 | Donovan |
| 2003/0076940 | A1 | * | 4/2003 | Manto ................... 379/114.05 |
| 2003/0198325 | A1 | * | 10/2003 | Bayne ................... 379/114.21 |
| 2004/0151292 | A1 | * | 8/2004 | Larsen ..................... 379/114.2 |

* cited by examiner

*Primary Examiner*—Quoc Tran (57) ABSTRACT

A method and associated system are provided for processing data to complete a collect telephone call to a called-party that has prepaid an account to pay for the collect call. Data is received regarding a collect call from a caller to the called-party. Next it is determining whether the called party is associated with a prepaid account and the rate to be applied to the collect call. The rate to be applied to the call is increased by a tax rate and the data is sent regarding the call rate to be applied to the collect call so that the call can be completed between the called party and caller.

15 Claims, 7 Drawing Sheets

SYSTEM AND METHOD FOR IMPLEMENTATION OF A CALLED PARTY PREPAYMENT PLAN

The present application claims priority under 35 U.S.C. 119(e) to U.S. Provisional Patent Application No. 60/510,132, filed on Oct. 14, 2003, which is incorporated herein by reference, in its entirety.

BACKGROUND OF THE INVENTION

1. Field of the Invention

The present invention relates generally to a system and method in which a called party can prepay phone charges in order to receive incoming calls at a discounted rate. In particular, an exemplary embodiment of the present invention relates to a system and method that can be used for inmates housed in a department of corrections facility making outbound calls to a customer with a prepaid account.

2. Background

In recent years, telecommunications service providers have enabled customers to pay for telephone calls in a variety of ways in order to suit their individual needs. For example, in one method a customer could utilize a payment program that requires no prepayment for activation of the account. Most customers utilize such a payment plan through participation in "monthly" billing for services. In another less popular example, customers can be billed on a per call basis. This is done for example through the use of coin deposit pay telephones.

In yet another way of paying for telecommunications services, customers can choose to prepay for telephony services. Prepaid telephony service is a very popular service as prepaid calling cards can be purchased by customers at numerous retail locations and used to place calls. Typically, a user or subscriber of a prepaid calling card initiates a phone call by calling a signaling agent, located at a call center, via a toll-free number (800/888) provided on the prepaid calling card. The subscriber is then prompted to enter his home telephone number and an identification number (PIN) also provided on the prepaid calling card using a telephone keypad. If the code is correct, the call is connected. Once the customer has used all of the purchased time, a new card can be purchased or the same card, in some instances, can be re-authorized upon payment of further fees.

Another type of prepaid billing that telecommunications providers employ for customers is a "called-party" prepayment method. By using this method, the called party (i.e., a customer) can pay for future received collect calls from various callers. Typically, to sign up for such a program, a customer initiates a phone call to a call center run by a telecommunications provider. Once a prepayment is received, the customer can receive prepaid calls.

However, while providing possible competitive advantages and allowing customers to select one or more of these services, the telecommunications providers encounter several monetary disadvantages in employing some of these programs. For example, with regard to a called party prepayment plan, when a call is made from a calling party to the called party, the taxes (required for every call connected) are paid at the time of sale (i.e., when the program is initiated). Over time this causes a loss of revenue for the telecommunications provider since taxes are calculated at the time of purchase rather than at the time of use.

Additionally, this tax calculation causes telecommunications providers additional monetary losses in terms of remuneration to employees where salary and bonus amounts are dependent upon sales. Specifically, employees are usually paid salary and commission and bonuses based upon sales. However, with these conventional prepaid plans, up until now, the allowed air time was sold in bulk, thereby making it impossible to resolve the amount of the total charge directed to call fees and the amount of the total charge directed to taxes.

SUMMARY OF THE INVENTION

Accordingly, what is needed is way of providing called party prepaid telephony charges that is advantageous to the customer as well as to the telecommunications company providing the service. Thus, in accordance with an exemplary embodiment of the present invention, a system and method are disclosed in which a called party can prepay in order to receive incoming calls.

A method and associated system are provided for processing data to complete a collect telephone call to a called-party that has prepaid an account to pay for the collect call. Data is received regarding a collect call from a caller to the called-party. Next it is determining whether the called party is associated with a prepaid account and the rate to be applied to the collect call. The rate to be applied to the call is increased by a tax rate and the data is sent regarding the call rate to be applied to the collect call so that the call can be completed between the called party and caller.

In accordance with a further aspect of the present invention, a manner of determining whether sufficient funds are in the prepaid account to pay for a call of a predetermined length is provided. Additionally, the tax rates are associated with the prepaid account based upon the location of the called party. In yet a further aspect of the present invention, a maximum call length can be determined based on the amount of funds in the prepaid account associated with the called party and based upon a predetermined maximum call duration. In a further aspect of the present invention, the total cost of the call can be separated into a first portion directed to the total taxes for the call and a second portion directed to the total rate charges. Moreover, the present invention can also determine whether multiple call rates apply to the call based upon the time and length of the call.

BRIEF DESCRIPTION OF THE DRAWINGS

The above and other aspects, features and advantages of this invention will be described in relation to the following figures in which like reference characters refer to the same parts throughout the different views.

DETAILED DESCRIPTION

An exemplary embodiment of the present invention relates to a called party prepaid calling system and method for use by a department of corrections facility. Although specific embodiments will be illustrated and described herein with regard to inmates residing within a department of corrections facility, it should be appreciated by those of ordinary skill in the art that such a system and method would also be advantageous, for example, for any situation where families or friends are separated by large distances such as children residing away from their families at camp or college. Additionally, this application is intended to cover any adaptations or variations of the present invention that generally relate to systems, methods and an apparatus for called party prepaid systems for inmate initiated collect calls.

In the following detailed description of the exemplary embodiments, reference is made to the accompanying drawings that form part hereof, and in which is shown by way of illustration, specific exemplary embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit and scope of the present invention. The following detail description is therefore not to be taken in a limiting sense.

Figure 1:
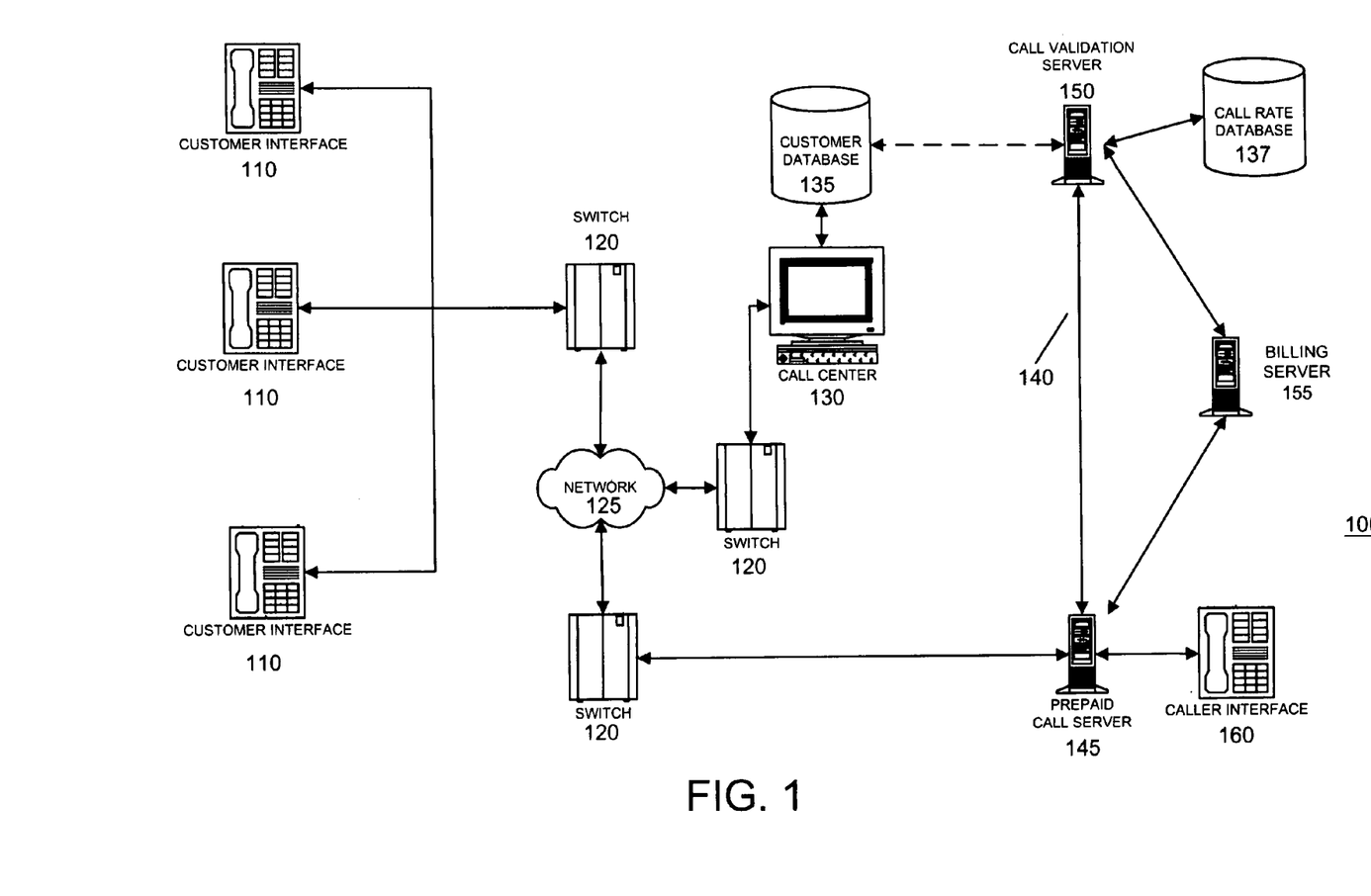
FIG. 1 is a functional block diagram illustrating an exemplary prepaid calling system and accompanying components.

FIG. 1 illustrates a network diagram that shows an exemplary implementation of the pre-paid calling system 100 of the present invention. In particular, the pre-paid calling system 100 can comprise one or more customer interfaces 110, switches 120, a network 125, a call center 130, a customer database 135, a call rate database 137, a high speed connection 140, a prepaid call server 145, a call validation server 150, a billing server 155 and a caller interface 160.

It is to be appreciated that the various components can be located at distant portions of a distributed network, such as a local area network, a wide area network, a telecommunications network, a dedicated network, an intranet and/or the internet, or within a dedicated secure or unsecured system. Thus, it should be appreciated, that the various components can be combined into one or more devices or collocated on a particular node of a distributed network, such as a telecommunications network. As will be appreciated from the following description, and for reasons of computation efficiency, the components could be arranged at any location within a distributed network without affecting the operation of the system.

Furthermore, various links connecting the elements can be wired or wireless links or any combination thereof, or any other known or later developed element(s) that is capable of supplying and/or communicating data to and from the connected elements. Additionally, it should be appreciated that while various functional components are illustrated, various other components, such as switches, routers, long distance carriers, firewalls, security components and/or software, or the like, can also be included without affecting the operation of the system.

The customer interfaces 110 and the caller interface 160 (discussed below) can be embodied as a telephone (land line, cellular, cordless, or the like) as well a computers, personal data assistants (with telephony capabilities), or the like that can make or receive telephone calls. When a customer uses customer interface 110 to make a call, the call is forwarded to a switch 120. The customer is able to reach any destination number by the input of a correct telephone number. Additionally, in accordance with the present invention, the customer can also call a call center 130 via public switch 120 and network 125.

Switch 120 represents the hardware that is able to receive a dialed telephone number and determine the necessary routing required for a telephone call to reach the intended destination the via network 125. The switch 120 may be part of a telephone network such as a public switched telephone network (PSTN). The switch 120 may also be, for example, a local exchange carrier (LEC) switch or an inter-exchange carrier (IXC) switch. The switch 120 may be realized as a digital cross matrix switch or as another variety of a conventionally known switching mechanisms. It should be understood that the system of the present invention could be adapted to employ many types of communication standards over network 125 and protocols such as voice-over-packet, voice-over-ip (VOIP), voice-over-network and wired or wireless communication systems, such as mobile phone communications, PDA communications, or the like. For example, U.S. Pat. No. 6,480,588, incorporated herein by reference, is directed to methods for providing prepaid telephony service via an Internet protocol (IP) network system. In general, the systems and methods of this invention will work equally well with any communications system or protocol.

The call center 130 can include one or more desk-top computers incorporated with a call distribution mechanism so as to enable multiple calls from customers to be deployed between one or more agents at the call center 130. The call center 130 normally is a centralized hub of a plurality of agents associated with the desk-top computers that are able to assist customers on behalf of a telecommunications company with regard to customer telephony issues. Agents at the call center 130 can, among other tasks, discuss account issues with new or existing customers, create new accounts, receive payments as well as amend customers' account information. Any data required for the agents' duties can be downloaded from the existing customer database 135 and any modifications, additions or deletions to customer data can be updated in the customer database 135 as needed by an agent.

The customer database 135 can include, for example, a database server to store various types of information including (but not limited to) customer data such as name, phone number billing address, billing information, and the like. The call rate database 137 can include, for example, a database server to store various types of information regarding billing rates. The databases further can comprise a read-only-memory (ROM) or other static storage device (e.g., programmable ROM (PROM), erasable PROM (EPROM), electrically erasable PROM (EEPROM), or the like) for storing static information and instructions.

The prepaid call server 145, the call validation server 150, and the billing server 155 work to communicate information related to a prospective call from the caller interface 160 to ensure proper handling and billing, as discussed in more detail below. Each of the servers can comprise any hardware element capable of storing data relating to various aspects of call validation. For example, the prepaid call server 145, the call validation server 150 and the billing server 155 may include a processor coupled to a computer readable memory and may additionally include a secondary storage element, such as database. The processor can be any of a number of well known computer processors, such as processors from Intel Corporation, of Santa Clara, Calif. In general, the prepaid call server 145, the call validation server 150, and the billing server 155 may be any type of computing platform connected to a network, directly or indirectly, and that may be implemented as a network of computer processors. The call validation server 150 and the prepaid call server 145 are connected together by dedicated a high speed connection 140 such as a 56K frame relay, or the like.

Figure 2:
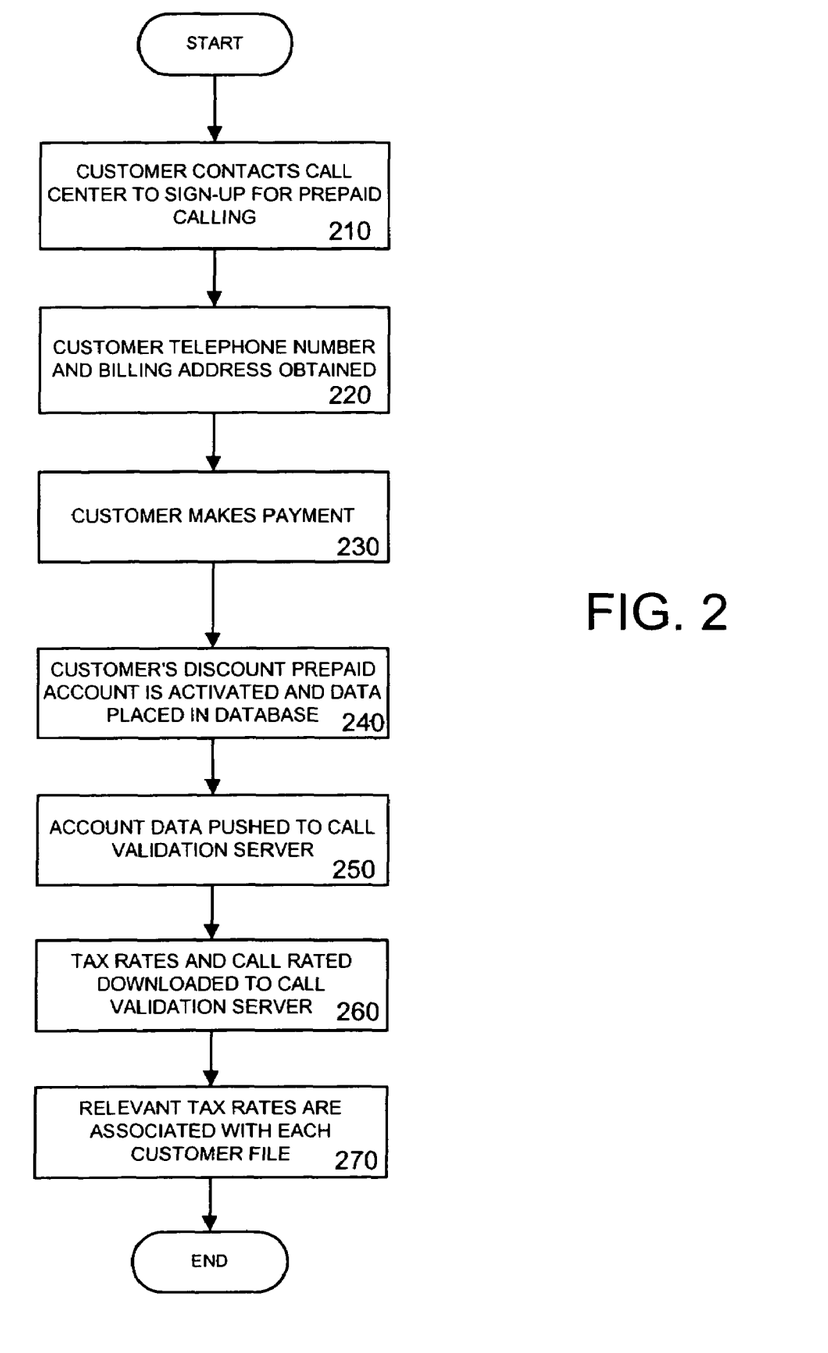
FIG. 2 is a flowchart illustrating a customer registration process in accordance with an exemplary aspect of the present invention.

FIG. 2 illustrates a flow chart describing customer registration and associated data manipulation in activating a called party prepaid account, in accordance with an exemplary embodiment of the present invention. In step 210, when a customer wishes to sign up for a called party prepaid program, they utilize the customer interface 110 to contact the call center 130. In step 220, an agent located at the call center 130 is assigned to the customer, usually via call distribution, and obtains basic information from the customer including name, billing address, telephone number, and the like. Once this information is obtained from the customer, in step 230 the customer is required to make a pre-payment (via, e.g., credit cards, debit cards, or the like) to the account so that it can be activated. Note that the customer may, at anytime, check the account balance by calling a voice response unit (VRU). Additionally, a VRU notice can be sent when funds are getting low to ensure that the customer is aware of their account credit amount.

In step 240, the customer's account is activated and the data associated with the account is placed into the customer database 135. In step 250, all accounts and data associated with the prepaid program are pushed to the call validation server 150. By pushing all prepaid data to the call validation server 150, this enables all prepaid account information to be centrally located and associated with a smaller amount of related accounts. This results in faster data processing and connection of collect calls to a called party from caller interface 160.

In step 260 once the data is has been moved to the call validation server 150, tax data is downloaded from a tax rate database (not shown). The tax rate database (as well as call rate database 137) is periodically updated current applicable rates so as to ensure proper call rate calculations. In step 270, the tax rate data is associated with customer accounts. The association of tax rate data, is based upon the location of the called party. Additionally, each individual account has stored with it at least an outstanding credit available and individual tax rate data.

Figure 3A:
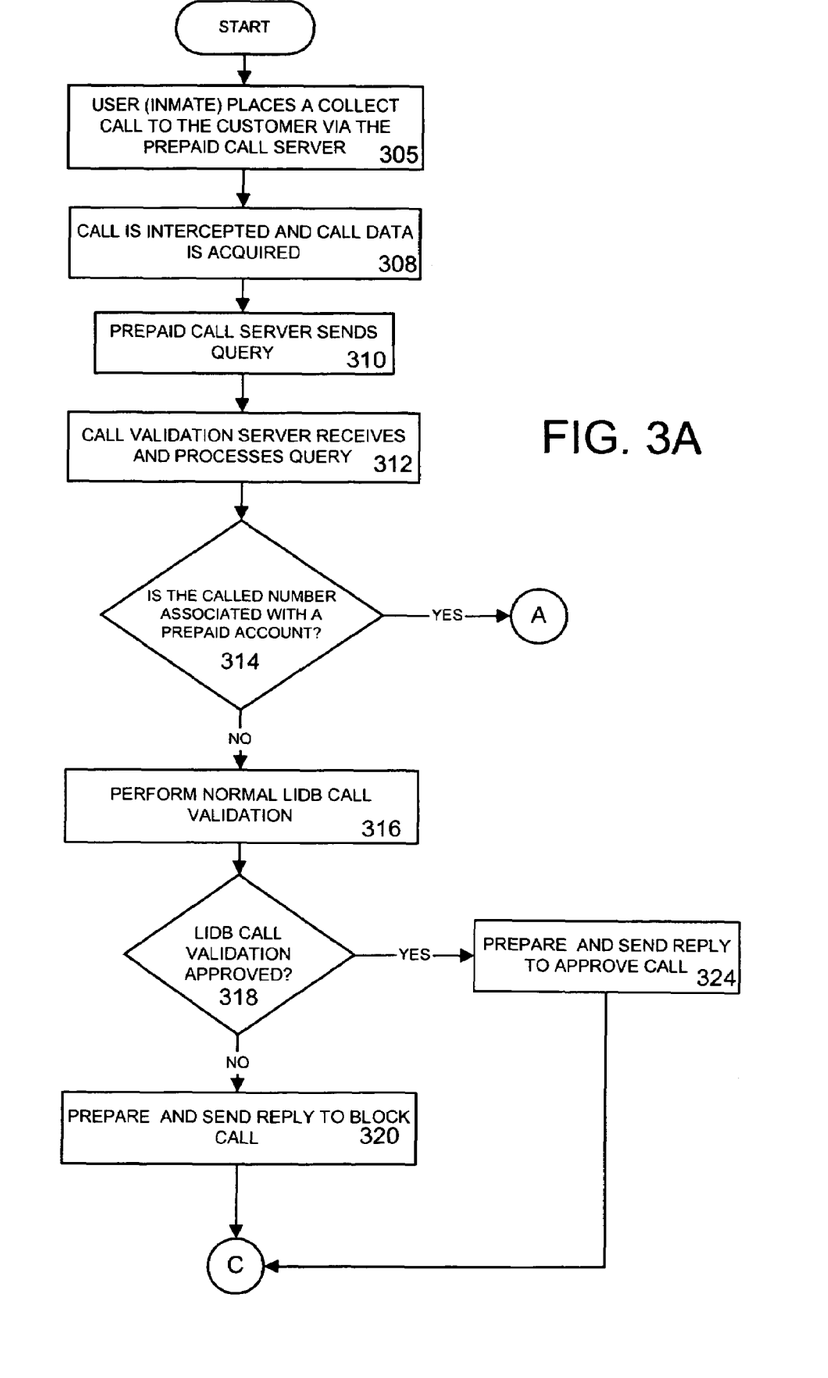
FIG. 3A is a flowchart illustrating an exemplary call initiation process in accordance with an exemplary aspect of the present invention.

As illustrated in FIG. 3A, the prepaid account data including tax rate data is stored at the call validation server 150. When a collect call is made to a person having a prepaid account, the prepaid account data is accessed and the cost of the call is deducted from the outstanding credit. In step 305, when a caller wishes to make a collect call to a customer, the caller interface 160 is used to place a call. In step 308, the prepaid call server 145 intercepts the callers call. At this point, the prepaid call server 145 obtains call information associated with the outgoing call and in step 310 sends a query message, regarding the monitoring and processing of the call to call validation server 150. The data obtained and forwarded by the prepaid call server 145, described in more detail below, is used by the call validation server 150 to determine how the call is to be handled (e.g., whether the call is approved or disapproved, the type of call, or the like) and to provide data back to the prepaid call server 145 to implement the instructions.

Figure 4:
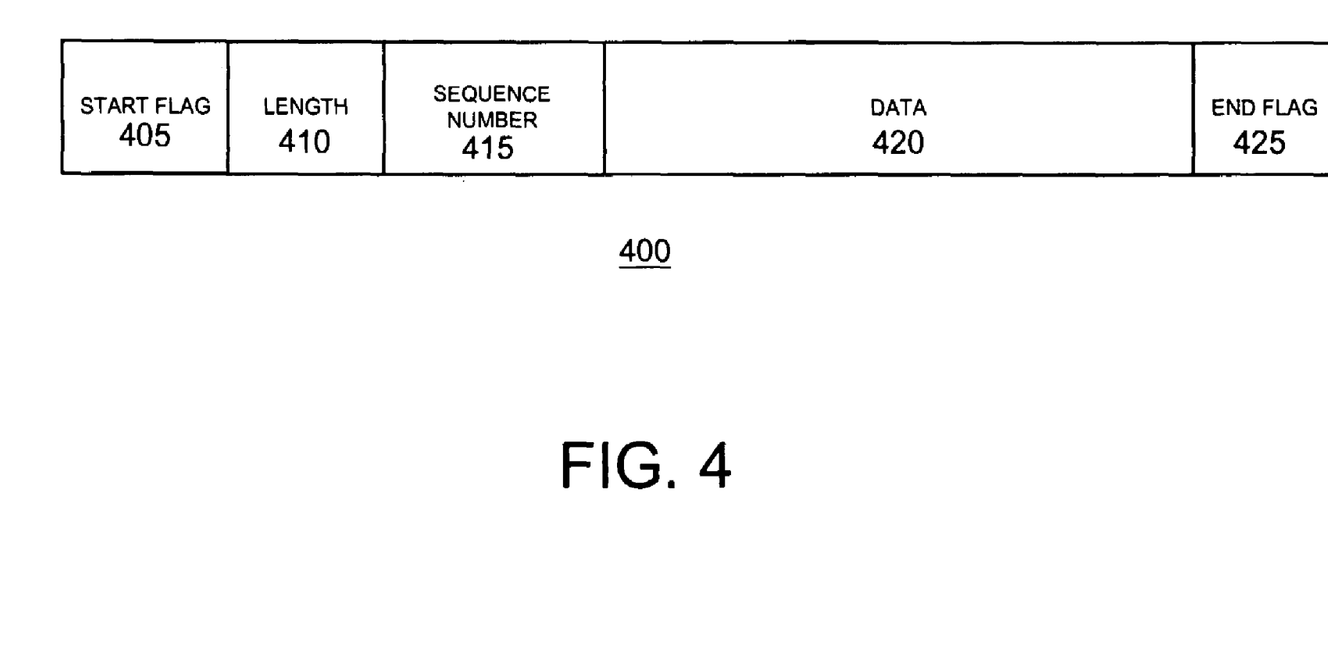
FIG. 4 is an exemplary message format employed between the prepaid call gateway and the call validation gateway of the prepaid calling system of FIG. 1.

The messaging format by which the call validation server 150 and the prepaid call server 145 communicate is illustrated in FIG. 4 and is in an XML format. While the format of the messaging is described as being XML, one of ordinary skill in the art would understand that many other types of computer languages could be employed to achieve the same or similar results. Each message 400 sent between the call validation server 150 and the prepaid call server 145 includes a start flag 405, length field 410, a sequence number field 415, a data field 420, and an end flag 425. The start flag 405 is merely an indication that a message is starting. The length indicator is a character field that provides the receiving entity an ability to verify the validity of the message. The sequence number field 415 represents a character field by the sender for synchronization and response matching. The data field 420 includes a buffer of text data, and the end flag 425 represents the end of the message.

When the call validation server 150 is queried by the prepaid call server 145, the data provided within the data field 420 in the query from the prepaid call server 145 can include:
  version—The version of the data format employed.
  vendor ID—The identification number of any associated equipment vendor.
  originating phone number—The phone number of the caller (e.g., an inmate in a department of corrections).
  validation request flag—Indicates a type of message sent (e.g., rate request, ping request, fraud, etc.)
  destination phone number—The called party's number.
  call type—Indicating how the connection is to be made between destination and originating interfaces (e.g., Collect call, debit, operator assisted, toll free, free, prepaid, etc.).
  inmate identification number—State assigned identification number associated with the caller.
  local time—date and time.
  maximum call duration—Maximum number of minutes an caller is allowed to make a call (e.g., if the caller is an inmate this limitation can be implemented in accordance with a rule set by the department of corrections).

While some of the data transmitted to the call validation server 150 is able to be determined from the interception of the call from the caller interface 160 by the prepaid call server 145, some data is provided by the caller (e.g., inmate identification number). Other data may be already available to the prepaid call server 145 or provided to it prior to a call being made (e.g., maximum call duration).

Turning back to the discussion of FIG. 3A, in step 312, when the request is received at the call validation server 150, the call is processed. For example, the destination number and the rate type of the call are retrieved. Once this data is retrieved, in step 314, the database associated with the call validation server 150 can be searched to determine if the called party associated with the destination phone number has a prepaid account with the telecommunications service provider. Additionally, the call rate is based upon the type of calls that the customer receives (e.g., local, interlata, intralata interstate, interstate, or the like). In step 316, if the party associated with the destination phone number does not have a prepaid account, then Line Information Database (LIDB) call validation is performed. However, if in step 314, a prepaid account is associated with the destination number, the call data is processed in step 330 of FIG. 3B (discussed below) to determine if sufficient finds are present in the account for a telephone call.

LIDB call validation is the standard way obtaining data from the local telephone companies' databases so that a call can be completed and properly billed. More specifically, an LIDB is a database maintained by a local telephone company that contains subscriber information, such as a service profile, name and address, and credit card validation information. In step 318 the call validation server 150 determines whether the LIDB call validation has been approved. If LIDB call validation is not approved then data to initiate a call blocking function is prepared and sent back to the prepaid call server in step 320. If on the other hand, the LIDB call validation is approved, then approval data is prepared and sent to the prepaid call server in step 324.

In steps 320 and 324, the call validation server 150 responds to the request message of the prepaid call server 145 with a message reply to block or approve the call, respectively, that can include the following in the data field 420:

version—The version of the data format employed.
general reply—A code that provides details as to why a call is disapproved or approved.
validating center code—A code that identifies the call validation server used during call validation.
summary reply—A code that identifies the call validation server.
a call surcharge—A flat processing fee associated with every call.
an initial time unit—The minimum duration of every connected call (e.g., 1 minute).
a cost of initial unit—A cost associated with the initial time unit.
a length of additional unit—An additional unit of time at which the call duration is incremented or measured (e.g., one minute).
a cost of each additional unit—A cost associated with each additional time unit.
a FUSF percentage—A Federal Universal Service Fee percentage.
international/local rate indicator—An indication of the rate applied.
billing prior to call—Indicates whether the call should be billed prior to connection.
call type—Describes how call is to be connected (prepaid, collect, debit, etc.).
exact dialing string—The exact dialing string to be used to connect the call.
next rate period start time—The starting time of a second rate.
length of next rate period units—A unit of time for the next rate period.
cost of each additional next rate period unit—A cost per unit of time associated with the next rate period.
a time limit override—For collect calls. A calculated override value for the maximum call duration (discussed in more detail below).

Figure 3B:
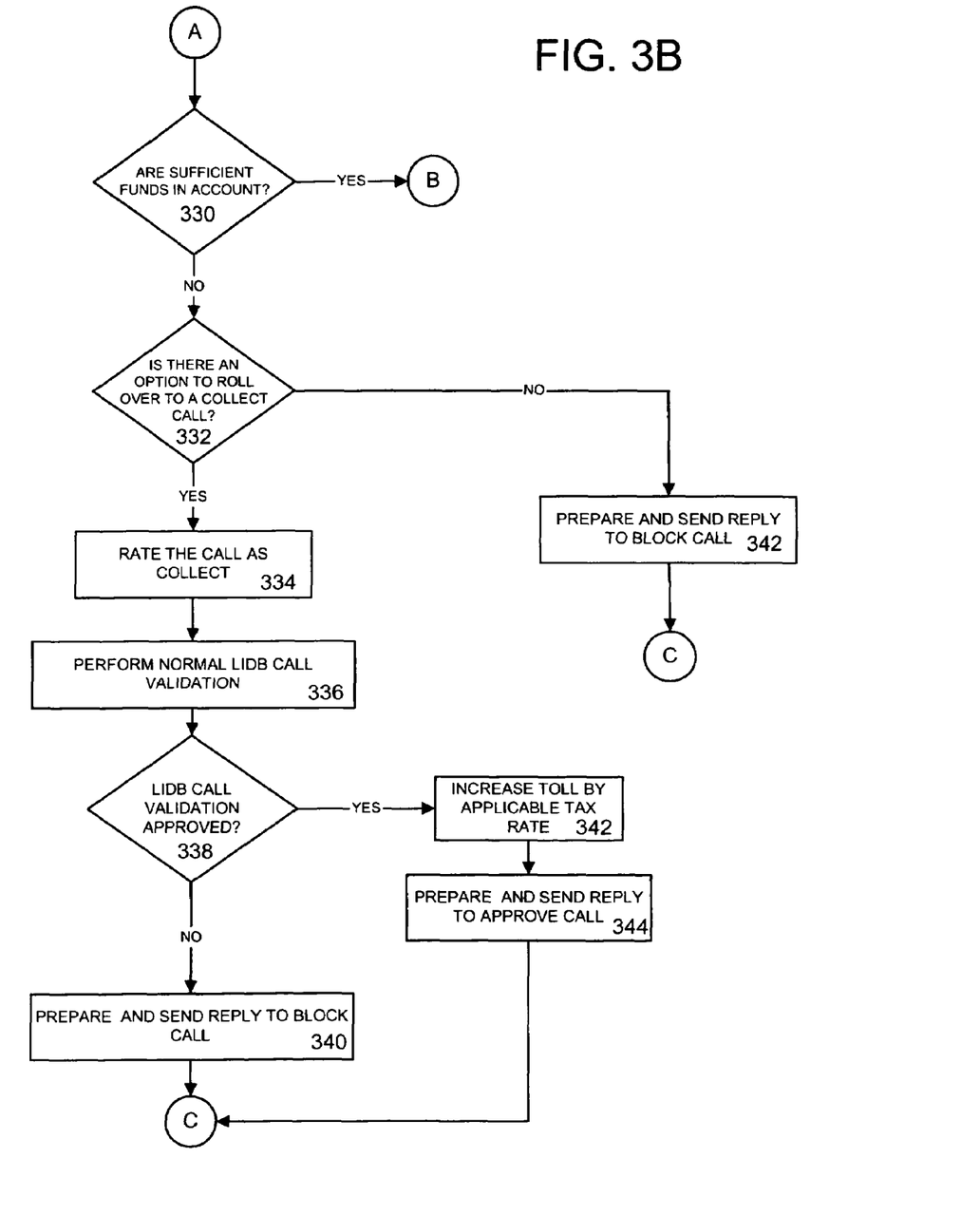
FIG. 3B is a flow chart illustrating a fund sufficiency process within the exemplary call initiation process in accordance with an exemplary aspect of the present invention.

FIG. 3B illustrates a flow diagram for implementing call processing based on whether enough funds are present in the prepaid account. From step 314 in FIG. 3A, if there is a prepaid account associated with the called number, a determination is made as to whether sufficient funds have been paid into the prepaid account for a call of a predetermined minimum length, in step 330. If there are enough funds in the account to cover the cost of a call of the predetermined minimum length (e.g., one minute), the process moves to processing illustrated in FIG. 3C (discussed in more detail below). If funds are not sufficient for a call of a predetermined time, then in step 332, data associated with the prepaid account is reviewed to determine if there is an option to roll over to a collect call. If there is no option to roll over to a collect call, then call block data is prepared and sent back to the prepaid call server in step 342. If there is a collect call option, then in step 334, the call is processed as collect, and rates are obtained for billing as a collect call.

In step 336, Line Information Database (LIDB) call validation is performed. As discussed above, LIDB call validations include obtaining data from a local database so that a call can be completed and properly billed. In step 338 the call validation server 150 determines whether the LIDB call validation has been approved. If LIDB call validation is not approved then the call block data is prepared and sent back to the prepaid call server in step 340. If on the other hand, the LIDB call validation is approved, then call rates are increased by the appropriate tax rate in step 342 and approval data is prepared and sent to the prepaid call server in step 344.

Figure 3C:
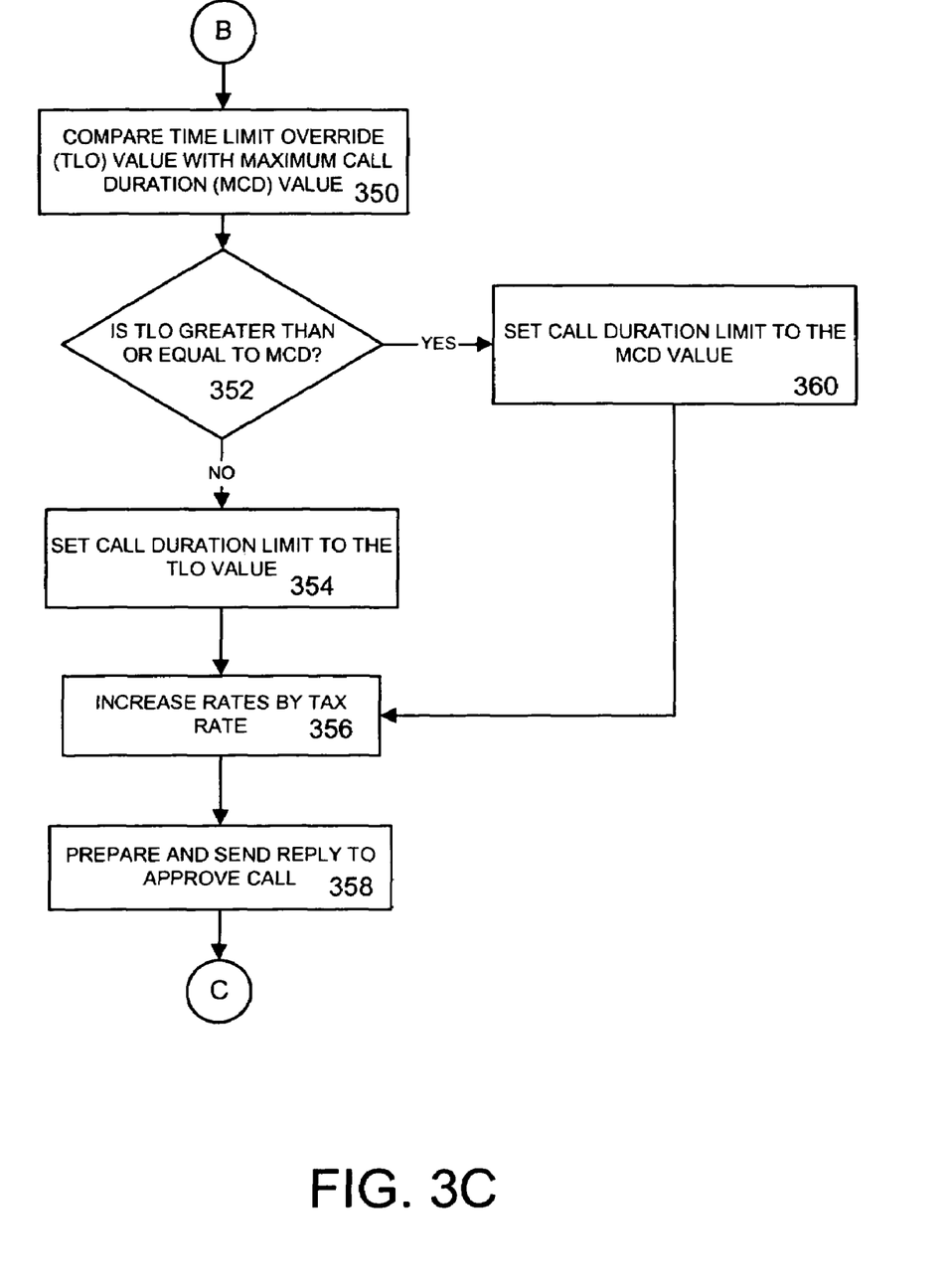
FIG. 3C is a flow chart illustrating call duration determination within the exemplary call initiation process in accordance with an exemplary aspect of the present invention.

FIG. 3C illustrates a flow chart describing the determination of the maximum call duration of a call. From step 330 in FIG. 3B, if sufficient funds reside in the called parties' prepaid account then, in step 350, the maximum call duration (MCD), found in the data field 420 of the query from the prepaid call server 145 is compared to the time limit override (TLO) value, found in the data field 420 of the reply from the call validation server 150. The TLO value is the amount of time that a caller and the called party can stay in contact before the amount of credit in the prepaid account drops below an acceptable level (e.g., zero dollars). In step 352, if the TLO value is greater than or equal to the MCD value, the call duration limit is set to the MCD value in step 360 and the process moves to step 356 where the call rates are increased by the tax rate associated with the predetermined account. On the other hand, if the TLO value is less than the MCD value, the call duration limit is set to the TLO value in step 354 then, in step 356, the call rates for the queried call are increased by the tax rate for the call. In step 358, the call validation server prepares and sends the reply message (including approval of the call) to the prepaid call server 145.

Figure 3D:
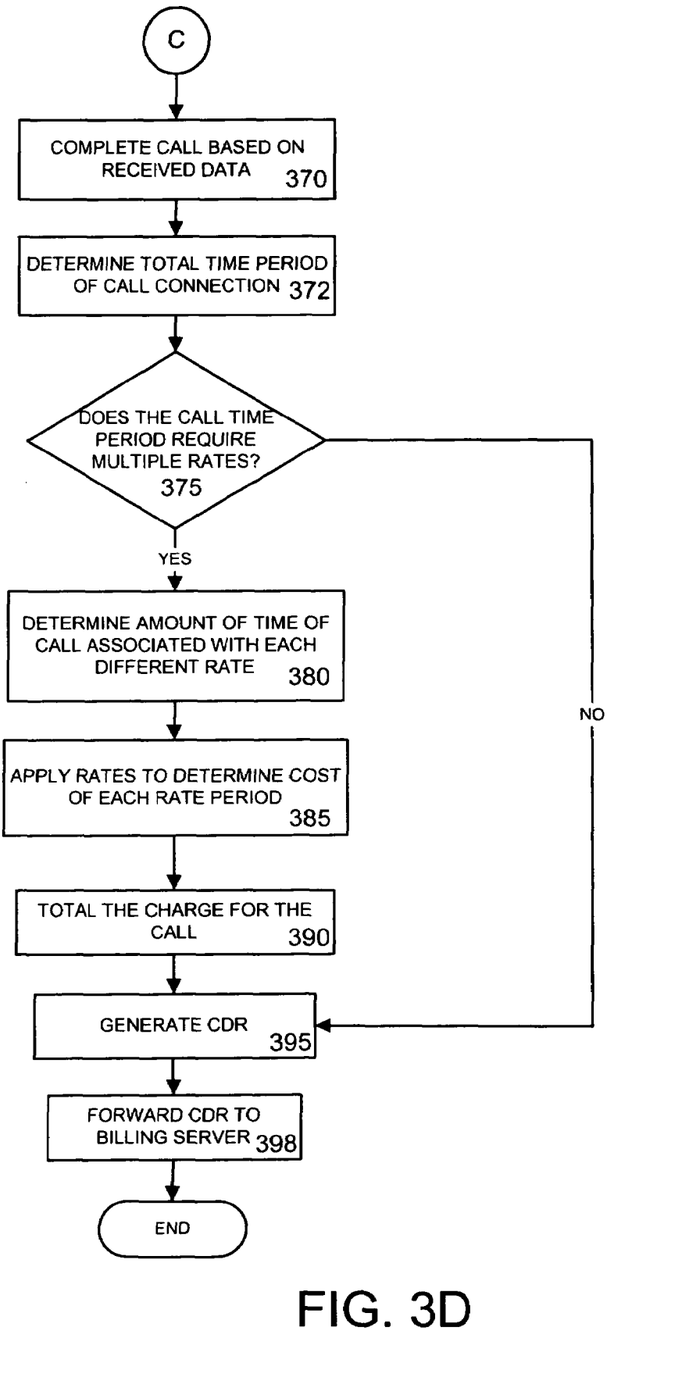
FIG. 3D is a flow chart illustrating a processing of a call once the call has been completed, in accordance with an exemplary embodiment of the present invention.

FIG. 3D depicts the processing of the call once the data to approve or block the call has been sent to the prepaid call server 145. In step 370, from steps 320, 324, 340, 342, 344 and 358 of FIGS. 3A, 3B and 3C, the prepaid call server receives the response to the query and completes or blocks the call according to the data in the reply. In step 372, once the call is completed, the prepaid call server determines the time period(s) during which the call was connected and the length of the call. Next in step 375, the prepaid call server determines if the call time period extended over multiple rate periods. If not, the process moves to step 395 where a call detail record CDR is generated and in step 398 and the CDR is forwarded to the billing server for further processing.

On the other hand, if there are multiple billing periods in which the call was conducted (which have different rates), in step 380 the prepaid call server the amount of time of the call associated with each different rate. Next, in step 385, the applicable rate for the amount of time of the call in each rate period calculated the total charge for the call is determined in step 390. The process moves to step 395 where a call detail record CDR is generated and in step 397 the CDR is forwarded to the billing server for further processing. Once the data is received at the billing server 155, the applicable amount of the charge for the call directed to taxes can be separated. This provides a unique advantage over normal prepaid calling in which the taxes are batched with the purchase before the call and are unable to be separated for later accounting.

The disclosed methods may be readily implemented in software using an object or object-oriented software development environment that provides source code that can be used on a variety of computer, server, or workstation hardware platforms. Alternatively, the disclosed called party prepaid methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. The called party prepaid methods however, can be readily implemented in hardware and/or software using any know or later developed systems or structures, devices and/or software by those of ordinary skill in the applicable art from the functional description provided herein, and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded in a telecommunications system, such as JAVA® or CGI script, as a resource residing on a server or graphics workstation, as a routine embedded on a dedicated inmate visitor scheduling system, or the like. The called party prepaid methods can also be implemented by physically incorporating the system into a software and/or hardware system such as the hardware and software system of a server and associated interface device.

It is, therefore, apparent that there has been provided, in accordance with the present invention, called party prepaid methods. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within in the spirit and scope of this invention.

What is claimed is:

1. A method for processing data to complete a collect telephone call to a called-party that has prepaid an account to pay for the collect call, comprising:
   receiving data regarding a collect call from a caller to the called-party;
   determining whether the called party is associated with a prepaid account;
   determining whether sufficient funds are in the prepaid account to pay for a call of a predetermined length;
   determining, when insufficient funds are in the prepaid account, whether to permit the call as a non-prepaid collect call;
   determining, when sufficient funds are in the prepaid account, the rate to be applied to the collect call;
   increasing the rate by a tax rate; and
   sending data regarding the call rate to be applied to the collect call so that the call can be completed between the called party and caller.

2. The method of claim 1, wherein the tax rate is associated with the prepaid account based upon the location of the called party.

3. The method of claim 1, wherein the caller is an inmate within a correctional facility.

4. The method of claim 3, further comprising:
   determining a maximum call length based on the amount of funds in the prepaid account associated with the called party and based upon a predetermined maximum call duration.

5. The method of claim 1, further comprising:
   receiving a call detail record at a billing server.

6. The method of claim 5, further comprising:
   separating the total cost of the call into a first portion directed to the total taxes for the call and a second portion directed to the total rate charges.

7. The method of claim 6, further comprising:
   determining whether multiple call rates apply to the call based upon the time and length of the call.

8. A system for processing data to complete a collect telephone call to a called-party that has prepaid account to pay for the collect call, comprising:
   means for receiving data regarding a collect call from a caller to the called-party;
   means for determining whether the called party is associated with a prepaid account;
   means for determining whether sufficient funds are in the prepaid account to pay for a call of a predetermined length;
   means for determining, when insufficient funds are in the prepaid account, whether to permit the call as a non-prepaid collect call;
   means for determining when sufficient funds are in the prepaid account, the rate to be applied to the collect call;
   means for increasing the rate by a tax rate; and
   means for sending data regarding the call rate to be applied to the collect call so that the call can be completed between the called party and caller.

9. The system of claim 8, wherein the tax rates are associated with the prepaid account based upon the location of the called party.

10. The system of claim 8, wherein the caller is an inmate within a correctional facility.

11. The system of claim 10, further comprising:
    means for determining a maximum call length based on the amount of funds in the prepaid account associated with the called party and based upon a predetermined maximum call duration.

12. The system of claim 8, further comprising:
    means for receiving a call detail record at a billing server.

13. The system of claim 12, further comprising:
    means for separating the total cost of the call into a first portion directed to the total taxes for the call and a second portion directed to the total rate charges.

14. The method of claim 12, further comprising:
    determining whether multiple call rates apply to the call based upon the time and length of the call.

15. A method comprising:
    receiving data regarding a collect call from a caller to a called party, the called party being associated with a prepaid account;
    determining whether sufficient funds are in the prepaid account to pay for a call of a predetermined length;
    processing the call as a non-prepaid collect call when insufficient funds are in the prepaid account; and
    processing the call as a prepaid collect call when sufficient funds are in the prepaid account.

* * * * *